(12) United States Patent
Sundholm

(10) Patent No.: US 10,625,936 B2
(45) Date of Patent: Apr. 21, 2020

(54) METHOD AND APPARATUS IN A PNEUMATIC PIPE TRANSPORT SYSTEM FOR MATERIAL, AND A CONVEYING SYSTEM FOR WASTES

(71) Applicant: MARICAP OY, Vantaa (FI)

(72) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 0 days.

(21) Appl. No.: 15/554,774

(22) PCT Filed: Mar. 8, 2016

(86) PCT No.: PCT/FI2016/050137
§ 371 (c)(1),
(2) Date: Aug. 31, 2017

(87) PCT Pub. No.: WO2016/142581
PCT Pub. Date: Sep. 15, 2016

(65) Prior Publication Data
US 2018/0237219 A1  Aug. 23, 2018

(30) Foreign Application Priority Data
Mar. 9, 2015 (FI) .......................... 20155152

(51) Int. Cl.
*B65F 5/00* (2006.01)
*B65G 53/52* (2006.01)

(52) U.S. Cl.
CPC ............ *B65F 5/005* (2013.01); *B65G 53/521* (2013.01)

(58) Field of Classification Search
CPC ...................................................... B65F 5/005
See application file for complete search history.

(56) References Cited

U.S. PATENT DOCUMENTS

| 3,490,813 A | * | 1/1970 | Hallstrom | ............... | B65F 5/005 |
| | | | | | 406/120 |
| 3,933,393 A | * | 1/1976 | De Feudis | ............... | B65F 5/005 |
| | | | | | 406/130 |

(Continued)

FOREIGN PATENT DOCUMENTS

| EP | 0 297 145 A1 | 1/1989 |
| EP | 0 596 750 A1 | 5/1994 |

(Continued)

OTHER PUBLICATIONS

International Search Report, issued in PCT/FI2016/050137, dated Jun. 10, 2016.

(Continued)

*Primary Examiner* — William R Harp
(74) *Attorney, Agent, or Firm* — Birch, Stewart, Kolasch & Birch, LLP

(57) ABSTRACT

Method for compensating a change in volume caused by a pressure difference of the intermediate container of an input point of a pneumatic pipe collection system for material and/or for preventing undesired material displacement from the intermediate container. In the method a bypass channel is arranged in the channel section formed by the intermediate container of an input point for compensating a change in volume resulting from the pressure difference of the pressures of different magnitudes possibly acting on different sides of the material and/or for preventing undesired material displacement from the channel section into the material conveying pipe. The invention also relates to an apparatus and to a wastes conveying system.

19 Claims, 8 Drawing Sheets

(56) References Cited

U.S. PATENT DOCUMENTS

| | | | | |
|---|---|---|---|---|
| 4,993,882 A | * | 2/1991 | Nishizuka | B65F 5/005 406/117 |
| 4,995,765 A | * | 2/1991 | Tokuhiro | B65F 5/005 209/580 |
| 2016/0145042 A1 | * | 5/2016 | Sundholm | B65G 53/46 100/41 |
| 2016/0167898 A1 | * | 6/2016 | Sundholm | B65G 53/46 406/120 |

FOREIGN PATENT DOCUMENTS

| | | |
|---|---|---|
| JP | 53-139369 A | 12/1978 |
| JP | 53-158180 U | 12/1978 |
| JP | 54-79780 U | 6/1979 |
| JP | 55-113302 U | 8/1980 |
| JP | 11-278660 A | 10/1999 |
| RU | 2 663 592 C2 | 2/2015 |
| WO | WO 00/46129 A1 | 8/2000 |
| WO | WO 2009/080880 A1 | 7/2009 |
| WO | WO 2009/080881 A1 | 7/2009 |
| WO | WO 2009/080882 A1 | 7/2009 |
| WO | WO 2009/080883 A1 | 7/2009 |
| WO | WO 2009/080884 A1 | 7/2009 |
| WO | WO 2009/080885 A1 | 7/2009 |
| WO | WO 2009/080886 A1 | 7/2009 |
| WO | WO 2009/080887 A1 | 7/2009 |
| WO | WO 2009/080888 A1 | 7/2009 |
| WO | WO 2011/110740 A2 | 9/2011 |
| WO | WO 2015/015053 A1 | 2/2015 |
| WO | WO 2015/015054 A1 | 2/2015 |
| WO | WO 2015/140403 A1 | 9/2015 |

OTHER PUBLICATIONS

Written Opinion of the International Searching Authority, issued in PCT/FI2016/050137, dated Jun. 10, 2016.

Supplementary European Search Report, issued in Application No. EP 16 76 1145, dated Oct. 8, 2018.

Japanese Notice of Reasons for Refusal, dated Oct. 8, 2019, for Japanese Application No. 2017-546681, with an English translation.

* cited by examiner

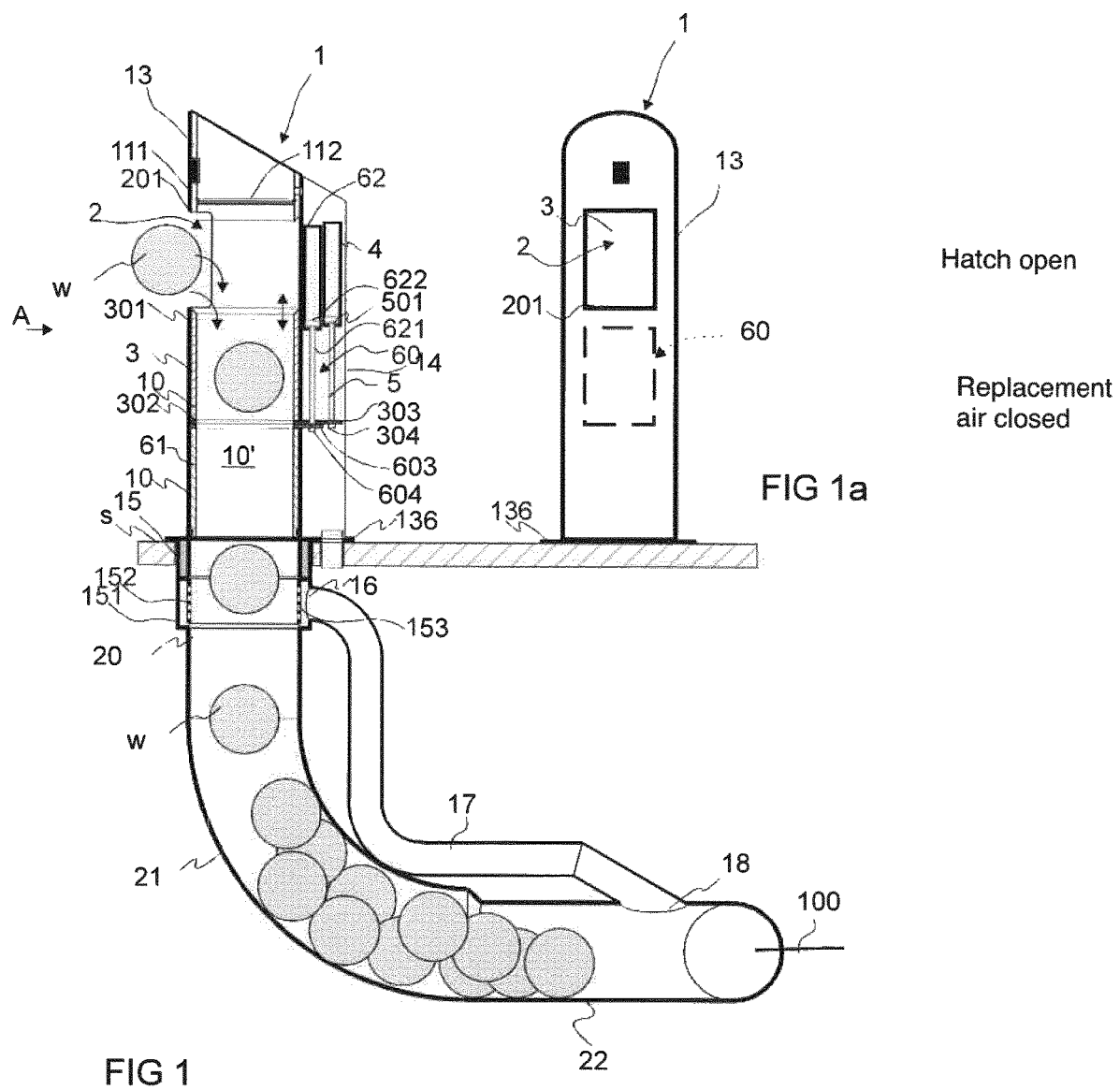

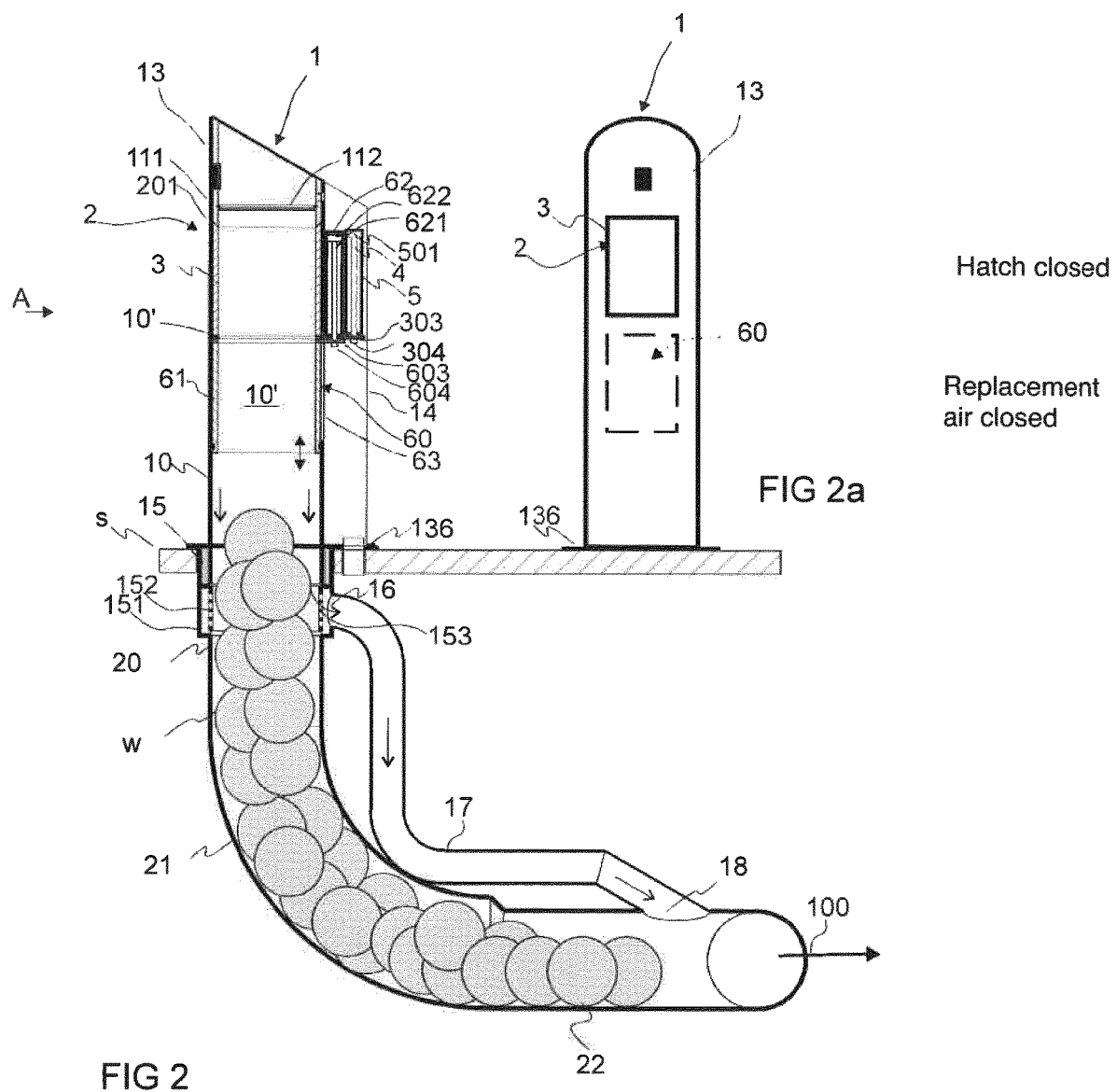

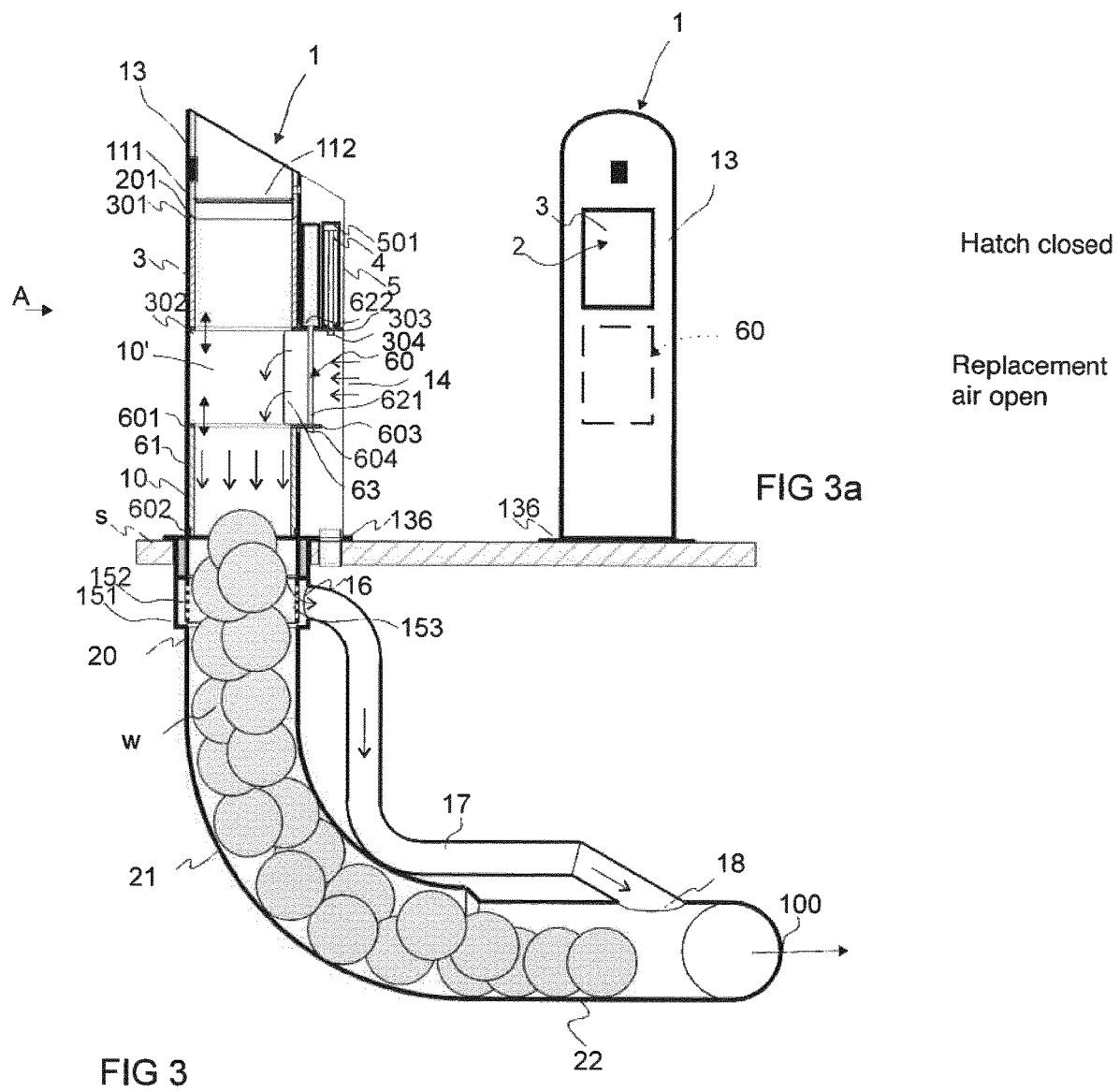

Hatch closed

Replacement air open

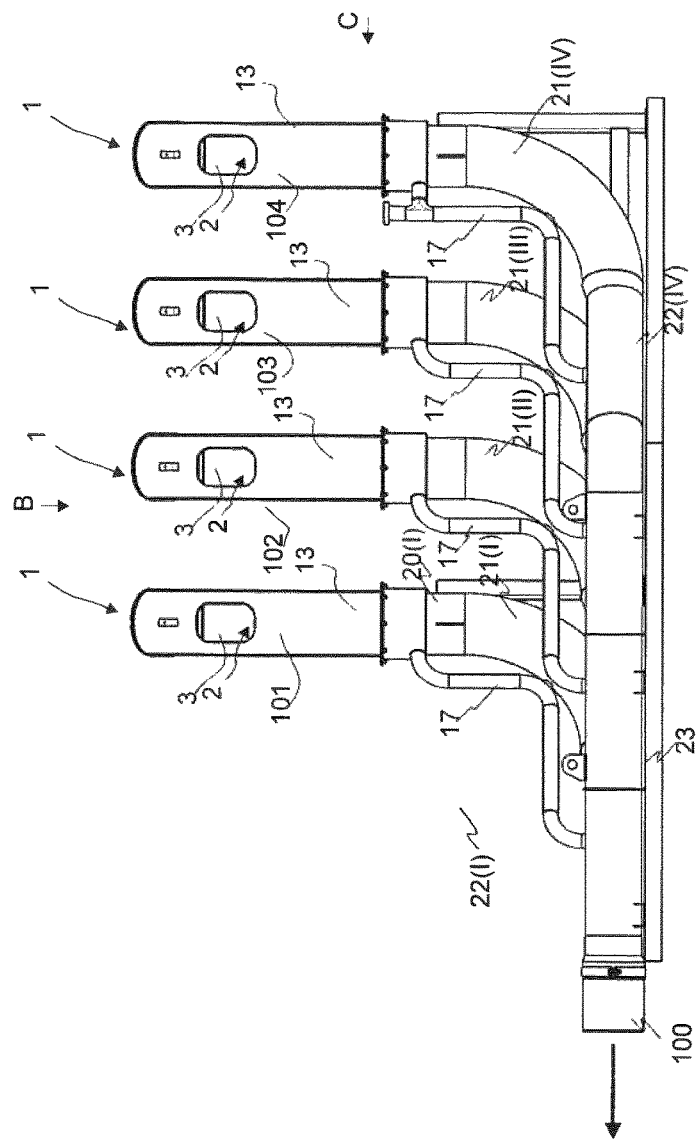
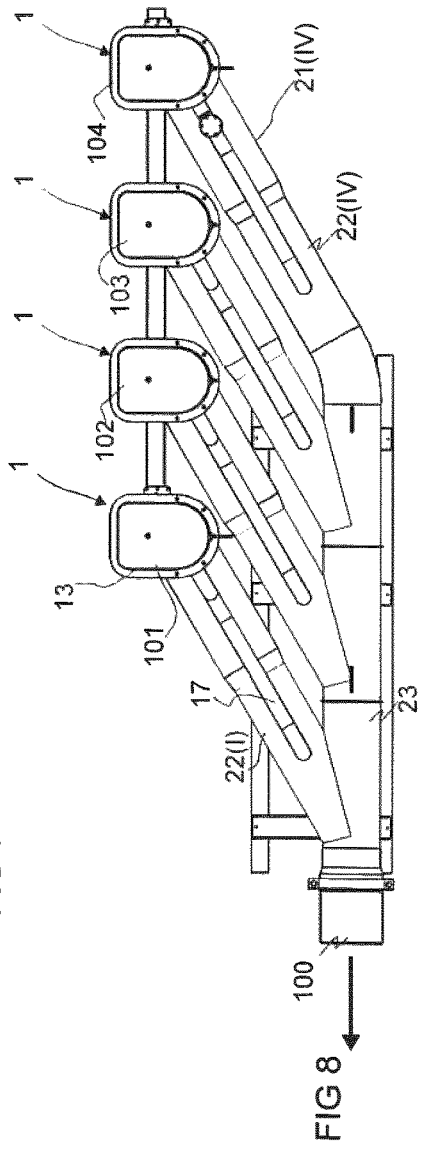
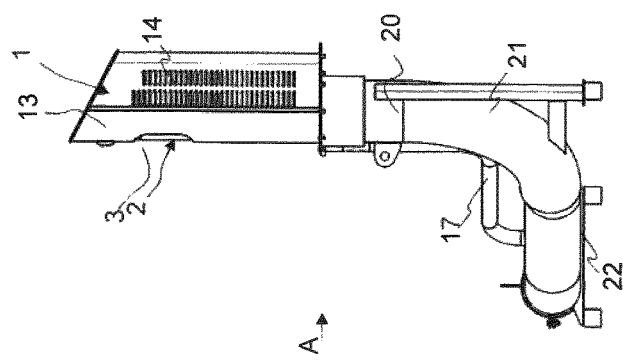
FIG 6
FIG 7
FIG 8

METHOD AND APPARATUS IN A PNEUMATIC PIPE TRANSPORT SYSTEM FOR MATERIAL, AND A CONVEYING SYSTEM FOR WASTES

FIELD OF THE INVENTION

An object of the invention is a method for compensating a change in volume caused by a pressure difference of the intermediate container of an input point of a pneumatic pipe collection system for material or for preventing undesired material displacement from the intermediate container.

An object of the invention is also directed to an apparatus for compensating a change in volume caused by a pressure difference of the intermediate container of the material channel of an input point of a pneumatic pipe collection system for material or for preventing undesired material displacement from the intermediate container.

The invention also relates to a wastes conveying system.

BACKGROUND OF THE INVENTION

The invention relates generally to material conveying systems, such as to pneumatic partial-vacuum transporting systems, more particularly to the collection and conveying of wastes, such as to the conveying of household wastes. Such systems are presented in publications WO 2009/080880, WO 2009/080881, WO 2009/080882, WO 2009/080883, WO 2009/080884, WO 2009/080885, WO 2009/080886, WO 2009/080887 and WO 2009/080888, among others. The invention also relates to waste feeding means, such as to input points or refuse chutes, with which waste is conveyed, typically by gravity, e.g. from higher input apertures in residential buildings to a lower collection space or corresponding container.

Systems wherein wastes are conveyed in piping by means of a pressure difference or suction are known in the art. In these, wastes are conveyed long distances in the piping by sucking. It is typical to these systems that a partial-vacuum apparatus is used to bring about a pressure difference, in which apparatus negative pressure is brought about in the material conveying pipe with partial-vacuum generators, such as with a fan, with vacuum pumps or with an ejector apparatus. A material conveying pipe typically comprises at least one valve means, by opening and closing which the replacement air coming into the material conveying pipe is regulated. Waste input points, e.g. rubbish containers or refuse chutes, are used in the systems at the waste material input end, into which waste input points material, such as waste material, is fed and from which waste input points the material to be conveyed is conveyed into a material conveying pipe by opening a discharge valve means, in which case, by means of the suction effect brought about by the aid of the partial vacuum acting in the material conveying pipe and also by the aid of the surrounding air pressure acting via the refuse chute, material such as e.g. waste material packed into bags, is conveyed from the refuse chute into the material conveying pipe and onwards to a reception point, where the material being transported is separated from the transporting air and conveyed for further processing or e.g. into a shipping container. The pneumatic waste-conveying systems in question can be utilized particularly well in densely populated urban areas. These types of areas have tall buildings, in which the feeding in of wastes into a pneumatic conveying system for wastes is performed via an input point, such as a refuse chute arranged, in the building.

Material can be conducted from an input point along a refuse chute into a container that is lower in the vertical direction, or an intermediate container can be in connection with the input points, into which intermediate container material fed from an input point is initially conducted and from where the waste material is conveyed onwards along the material conveying piping to a reception point.

The volume of the intermediate container that is between the input aperture of a waste input point and the discharge valve typically varies according to the embodiment. Typically the volume can be 100-600 l. An advantage of using an intermediate container is that it can increase the capacity of the input point, in which case the actual conveying system does not need to be started often. Depending on the application site, the conveying system is used 1-3 times a day to convey the material that has collected in the intermediate container. An advantage of a conventional intermediate container is also that the energy consumption of the conveying system can be reduced, because more waste can be conveyed with the same conveying cycle. One drawback, among others, of known solutions is that the space requirement of an intermediate container, especially when an input pipe is used as an intermediate container, is large. Typically an input pipe applied in a vertical attitude as an intermediate container becomes long, and a rather deep excavation pit must be arranged in the ground to install it. The excavation work is expensive, particularly in rocky areas where blasting is required for achieving the trench needed. The excavation work is expensive, particularly in rocky areas where blasting is required for achieving a trench. The installation depth of a typical intermediate container according to solutions known in the art is in the region of 2.5-3.5 m. The typical installation depth in the installation of the material conveying piping of a pneumatic wastes conveying system is smaller than this, in the region of 1-1.5 m.

A discharge valve, which opens and closes the connection from the intermediate container to the material conveying pipe, in many cases requires a separate space, i.e. a so-called pit, from where the discharge valve and its actuators can be serviced and installed.

A problem that arises in cases in which a separate discharge valve, i.e. waste valve, is not used is that the material can travel in an undesired manner into the material conveying pipe as a result of a pressure difference between an input point and the material conveying pipe and/or possible leakage air of an input point.

The aim of the present invention is to achieve a completely new type of solution in connection with the intermediate containers of the input points and material conveying pipings of a wastes conveying system, by means of which solution the drawbacks of known solutions are avoided. One aim of the invention is to achieve a solution by the aid of which an effective and operationally reliable solution can be achieved, wherein a discharge valve, i.e. waste valve, is not needed between the intermediate container of an input point and the material conveying piping. Another aim is to achieve a solution for compensating a change in volume resulting from a pressure difference of an intermediate container of pneumatic negative pressure systems for material, so that undesired displacement towards the material conveying pipe of the material fed into the intermediate container is avoided. Yet another aim is to achieve a solution for compensating leakage air of an intermediate container of an input point, so that undesired displacement into the material conveying pipe of the material fed into the intermediate container is avoided.

BRIEF DESCRIPTION OF THE INVENTION

The invention is based on a concept wherein a bypass channel is arranged in the channel section of the intermediate container of an input point for compensating a change in volume resulting from a pressure difference of the intermediate container of the input point. The bypass channel is also utilized for conducting possible leakage air of the input point into the material conveying pipe past the material that has been fed into intermediate container. The aforementioned are applied e.g. in cases in which it is not intended to empty the intermediate container of an input point. A bypass channel can also be used for conducting replacement air when it is desired to empty the intermediate container of the input point. Material fed into an intermediate container can form a piston-like plug when it compacts in the intermediate container, in which case, owing to the bypass channel, the change in volume of the material resulting from the pressure difference of an intermediate container of an input point, as well as the combined effect of possible leakage air of the input point plus the suction acting from the conveying pipe on the material that has been fed into the intermediate container and is trying to displace, can be avoided when it is not intended to displace the material with the combined effect of replacement air and suction.

The method according to the invention is for compensating a change in volume caused by a pressure difference of an intermediate container of an input point of a pneumatic pipe collection system for material or for preventing undesired material displacement from the intermediate container, and includes the following steps:
arranging a bypass channel at least for:
compensating a change in volume resulting from the pressure difference of pressures of different magnitudes possibly acting on different sides of the material in a channel section functioning as the intermediate container of the input point or for;
preventing undesired material displacement from the channel section into a material conveying pipe, when a suction side of a partial vacuum source is connected to act in the channel section from a direction of a material conveying pipe of the pneumatic pipe collection system.

The apparatus according to the invention compensates for a change in volume caused by a pressure difference of an intermediate container of a material channel section of an input point of a pneumatic pipe collection system for material or for preventing undesired material displacement from the intermediate container, wherein the apparatus comprises:
a bypass channel configured for at least one of:
compensating a change in volume resulting from the pressure difference of pressures of different magnitudes possibly acting on different sides of the material in the channel section functioning as the intermediate container of the input point, or
preventing undesired material displacement from the channel section into a material conveying pipe, which bypass channel forms a pathway for a gaseous medium at least partly past a material space of the intermediate container,
at least when a suction side of a partial-vacuum source is connected to act in the channel section from a direction of the material conveying pipe of the pneumatic pipe conveying system.

The present invention is also directed to a wastes conveying system.

The solution according to the invention has a number of important advantages. By means of the invention a change in volume, and the drawbacks associated with it, of the material of the intermediate container of the channel section can be compensated. By means of the invention the displacement in an undesired manner of material that is in the intermediate container of a channel section from the intermediate container into the material conveying pipe can be avoided. When the material forms a plug, similar to a piston, in an intermediate container, the displacement of material can be prevented with the bypass channel by compensating the pressure difference in the channel space on different sides of the material that has been fed into it, and possibly also by conducting leakage air in the bypass channel from the channel space, from the first side of the material, i.e. from the input aperture side, into the channel space, to the second side of the material, i.e. to the conveying pipe side. This is advantageous in particular when the intermediate containers of other input points are emptied, when suction is acting in the channel space from the conveying pipe side. In this case the mixing together of different categories of waste material in the conveying pipe is avoided. A bypass channel can also be used for conducting replacement air to the delivery end of the intermediate container of a channel part, when the actual replacement air valve of an input point or channel part has been opened and it is desired that the material of the intermediate container starts to move into the actual conveying pipe and be conducted onwards to the delivery end of the pneumatic conveying system for material, into a separating device and/or into a waste container. According to one embodiment the bypass channel can be formed to be smaller in its flow cross-sectional area than the flow cross-sectional area of the channel space. According to one embodiment the cross-sectional area of the bypass channel is preferably approx.10-25% of the cross-sectional area of the material conveying pipe, such as of the waste pipe. The bypass channel can be formed into a pipe section arranged outside the channel space of the actual intermediate container. According to one embodiment the channel parts formed by the intermediate container and the bypass channel are integrated into one structural element. By arranging an expansion and a suitable screen part for it in the channel part at the point connecting to the first end of the bypass channel, the passage of large-sized particles into the bypass channel can be avoided and an operationally reliable pathway from the top part of the channel part into the bypass channel is achieved for leakage air or for some of the replacement air.

According to one embodiment a connection point is arranged in the bypass channel, e.g. for connecting a cleaning means or a suction/blowing means to the bypass channel, in which case an effective arrangement for cleaning the bypass channel, if necessary, is obtained. According to one preferred embodiment the connection point of the bypass channel is provided with a plug. The solution according to the invention is well suited to both small and large systems. The invention is suited to material conveying systems in which suction and replacement air are used together for moving material and in which a separate discharge valve is not used between the intermediate container of an input point and the material conveying pipe. In addition, the bypass channel can also be used for conducting some of the replacement air to the end of the intermediate container on the actual conveying pipe side. The invention can be applied in connection with many types of intermediate containers. An intermediate container can e.g. be disposed in a horizontal attitude or it can comprise a horizontal section, in which case a deep installation pit is not needed for it, but instead a conventional excavation depth can be used for the waste conveying piping. By arranging the channel section of the intermediate container of one material category to be such that the channel sections of the intermediate container of at least one other input point, typically of all the input points, of the feed-in station connect to it, a collection piping assembly is achieved wherein the intermediate container of the material category requiring most intermediate container volume can be formed, on the one hand, in a shallow space, but however large in volume. In this case the number of input points for the material category can at the same time be limited. The entry of replacement air in the material conveying phase can be regulated e.g. with a separate replacement air valve arranged in the container part of an input point. By opening and closing the replacement air valve, the start of movement of material in the intermediate container can be efficiently regulated when the suction side of the partial-vacuum source is connected to act in the channel section from the direction of the conveying pipe. By using a bypass channel for conducting also replacement air, replacement air can be brought into the body of material to be displaced from the intermediate container, which enhances the efficiency of displacing material in the conveying pipe.

According to the invention, input points, which are the input points of waste, such as waste receptacles or refuse chutes, can be used for feeding in material. The method and apparatus according to the invention are particularly well suited in connection with conveying systems of waste material, such as waste material arranged in bags, e.g. household waste or recyclable material.

BRIEF DESCRIPTION OF THE FIGURES

In the following, the invention will be described in more detail by the aid of an embodiment with reference to the attached drawings, wherein FIG. 1 presents a simplified and partially sectioned embodiment of an apparatus according to the invention, in a first operating state, FIG. 1a presents a detail from the direction of the arrow A of FIG. 1, FIG. 2 presents a simplified and partially sectioned embodiment of the apparatus according to the invention, in a second operating state, FIG. 2a presents a detail from the direction of the arrow A of FIG. 2, FIG. 3 presents a simplified and partially sectioned embodiment of the apparatus according to the invention, in a third operating state, FIG. 3a presents a detail from the direction of the arrow A of FIG. 3, FIG. 6 presents an apparatus of the invention, from the direction C of FIG. 7, FIG. 7 presents an apparatus of the invention, from the direction A of FIG. 6, FIG. 8 presents an apparatus of the invention, from the direction B of FIG. 7.

DETAILED DESCRIPTION OF THE INVENTION

Figures 4, 4A:
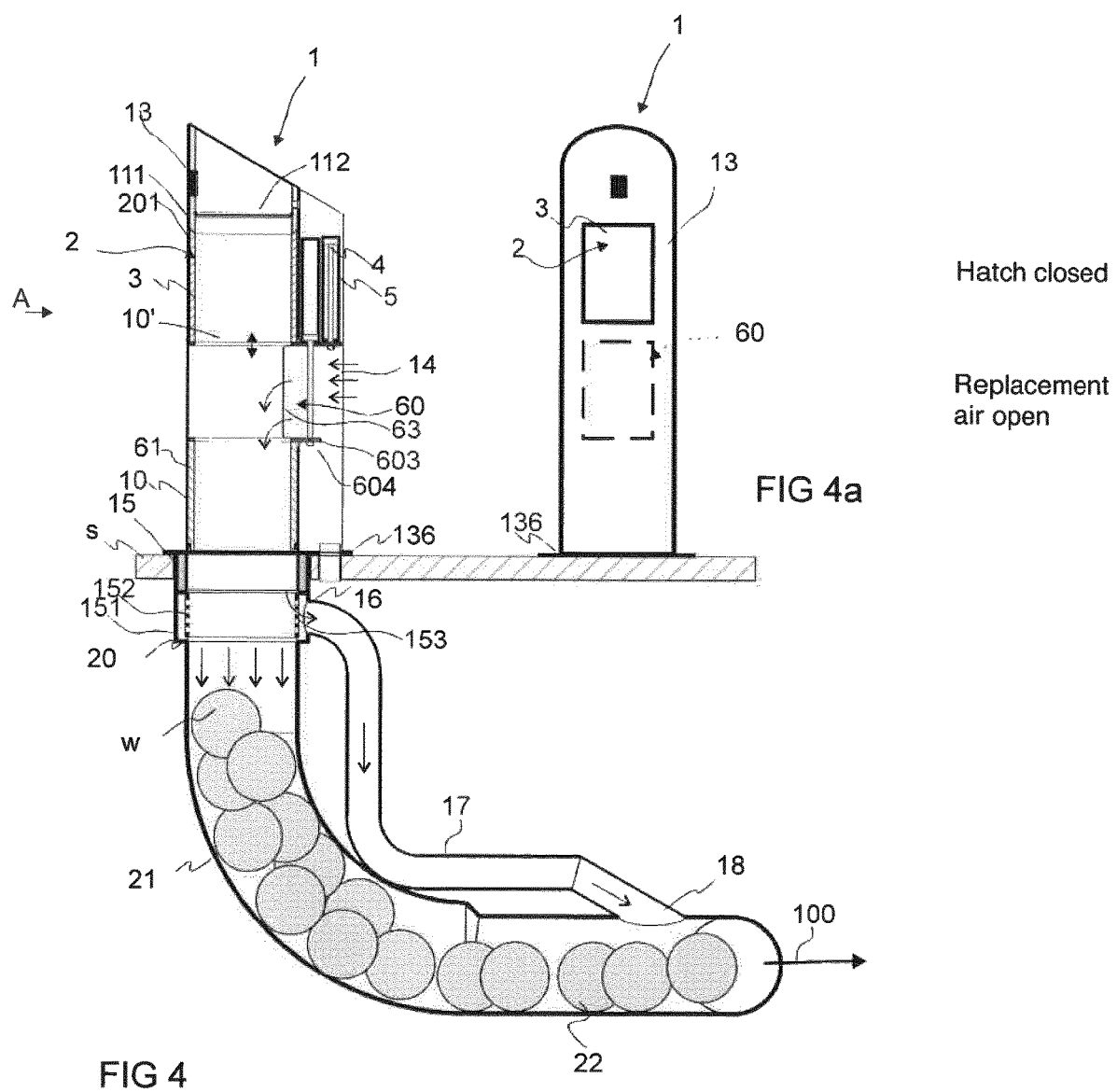
FIG. 4 presents a simplified and partially sectioned embodiment of the apparatus according to the invention, in a fourth operating state.
FIG. 4a presents a detail from the direction of the arrow A of FIG. 4.

FIGS. 1-4 present a simplified view of an apparatus according to the invention in connection with one input point 1 and its intermediate container. The apparatus is intended to connect a pneumatic material conveying system to a material conveying pipe 100 (marked diagrammatically with an arrow at the starting end of the conveying pipe only) and via the conveying pipe to a separating device and to a partial-vacuum generator, such as a vacuum pump or fan, of the pneumatic material conveying system, the suction side of which partial-vacuum generator can be connected to a separating device and via it to conveying piping and onwards via a conveying pipe through channel parts to act in the material space of the input point and of the intermediate container.

FIGS. 1-4 describe in a simplified manner the operation of the input points. In each input point 1 is an input aperture 2 for feeding material w, such as waste material or recyclable material, into a feed-in container 10 of the input point, and onwards via the intermediate container 20, 21, 22 for conveying material into the material conveying pipe 100, and onwards to the delivery end of the pneumatic material conveying system, into a separating device and/or into a waste container. An openable and closable hatch 3 or corresponding is in connection with the input aperture 2 in the embodiment of the figure, which hatch when closed covers the input aperture 2 and when opened enables the feeding of material w via the input aperture into the container space of the input point and onwards into the intermediate container. An actuator, such as a cylinder-piston combination, for example, is arranged to drive the hatch 3 of the input aperture, to which actuator the hatch 3 is arranged movably between at least two positions, a first position, in which it covers the input aperture 2, and a second position, in which the input aperture is open. It can be conceived that the hatch in some embodiments can be manually openable and closable.

In FIGS. 1-4 and 1a-4a the input point 1 is arranged above a mounting surface s, such as above the ground surface or floor level. A channel, such as a coupling section, extends from the feed-in container 10 of an input point into the channel part 20 that is below the surface s. A coupling section 15 is between the feed-in container 10 and the intermediate container formed by the channel part 20, with which coupling section the feed-in container is connected to the intermediate container 20.

An input point has an enclosure 13, which forms the outer walls of the input point. An input aperture 2 is formed in the enclosure 13, as also are apertures 14 (presented in more detail in FIGS. 6-10) for conducting replacement air to inside the enclosure.

FIGS. 1-4 present one input point 1 partially sectioned, and FIGS. 1a-4a the input point from the input aperture side from the direction A of FIG. 1-4. There can be more input points, as in FIGS. 6-10, in which there are a number of input points, at least two, in the figures four, input points. In the input points of the figures, it is characteristic of an input point that it can be connected via a material conveying pipe to a separator means without a discharge valve, i.e. a so-called waste valve, being between the input points and the material conveying pipe.

FIG. 1 presents an operating state, in which the input aperture 2 of an input point for waste is open and material w can be fed via the input aperture 2 into the channel space 10' of the input point and onwards into the intermediate container formed by the channel parts 20, 21, 22 that are an extension of it. In the phase of feeding in material the first shut-off means 3, such as a hatch, normally otherwise closing the input aperture 2 is in the second position, in which case the input aperture is open. The separate pathway 60 for replacement air into the channel space 10' of the input point is closed, in FIG. 1 with the first shut-off means 3. The functions of an input point 1 are presented in more detail hereinafter. Other types of input points can be applied in connection with the invention.

FIG. 2 presents an operating state in which the shut-off means covering the input aperture 2 of the input point 1 is in the first position, i.e. in the closed position, and prevents the infeeding of material from the input aperture into the channel space 10' of the input point. Also the pathway 60 for replacement air is closed in the figure with a second shut-off means, which is displaced from the position of FIG. 1 into the position of FIG. 2. This is the operating state the input point is in when new material cannot be fed into it and it is not desired to displace into the actual material conveying pipe 100 the material w that has been fed into the intermediate container of the input point. Since a separate discharge valve, i.e. a so-called waste valve, is not needed in connection with the input point and intermediate container according to the invention, the suction brought about by the partial-vacuum generator of the pneumatic waste conveying system is able to act from the direction of the material conveying pipe 100 in the section 22 of the intermediate container on the conveying pipe side.

The suction acts from the material conveying pipe 100 side on the material w of the intermediate container, and in the channel on the input point side 1 there would normally be in this case atmospheric air pressure. In this case the change in volume resulting from the pressure difference acts on the material, wherein the material tries to expand as a result of the change in volume from the larger pressure towards the smaller pressure, i.e. towards the conveying pipe. In this case material can travel into the conveying pipe. This is undesirable because the material w of the intermediate container of the input point in question can belong to a different category of the material being conveyed than the material category of another input point possibly being emptied at the same time, in which case different categories of material would mix together in the conveying pipe. To compensate this change in volume resulting from a pressure difference, a bypass channel 17 is arranged e.g. in the embodiment of FIGS. 1-4. The bypass channel 17 is connected in the embodiment of FIG. 2 to the channel space at a first end 16 and a second end 18, in which case the channel space is in medium connection via the bypass channel 17 from the point of connection of the first end 16 of the bypass channel 17 and from the point of connection of the second end 18 of the bypass channel 17. The bypass channel 17 can in this case e.g. bypass a plug caused by the material w fed into the channel space, in which case the change in volume resulting from the pressure difference of the pressures acting on different sides of the material of the intermediate container can be compensated by means of the bypass channel. As a result of the bypass channel 17 a change in volume resulting from a pressure difference can be compensated, even if there were an obstacle, such as a plug brought about by the material, in the channel space of the intermediate container, between the point of connection of the first end of the bypass channel and the point of connection of the second end.

Since it is possible that the material has, e.g. when feeding it in from an input point, compacted in the intermediate container and forms a plug in the intermediate container, it is possible also that possible leakage air acting from the input point 1 side together with suction acting from the direction of the conveying pipe 100 try to displace the plug formed from material w towards the material conveying pipe 100. This is undesirable because the material of the intermediate container of the input point in question can belong to a different category of material than the material category of another input point possibly being emptied at the same time, in which case different categories of material would mix together in the material conveying pipe. For this reason a bypass channel 17 is arranged according to the invention, the bypass channel extending mainly from the first end of the channel space of the intermediate container to the second end of the material channel of the intermediate container, in such a way that the bypass channel is arranged to mainly bypass the material collection space of the intermediate container, in which case a possible leakage air flow travels mainly via the bypass channel 17. As a result of this, the material that has collected in the intermediate container is not able to displace in an undesired manner from the intermediate container into the material conveying pipe from the combined effect of the leakage air and the suction acting from the direction of the material conveying pipe.

FIG. 3 presents a third operating state in which it is desired to convey the material w that has collected in the intermediate container of the input point into the material conveying pipe and onwards along the material conveying pipe into a separating means of the material conveying system and/or into a waste container. In this case from the situation of FIG. 2 the pathway 60 for replacement air is opened by displacing the second shut-off means 61 into the second position, in which case replacement air is able to travel into the material channel 10 of the input point. The replacement air and also the suction acting from the direction of the material conveying pipe 100 together try to displace the material w towards the material conveying pipe 100. According to the invention the bypass channel 17 can also be utilized in feeding replacement air from the second end 18 of the bypass channel into the body of material w being conveyed. Owing to the bypass channel 17, at least some of the replacement air can be conducted past the material w that is in the channel space of the intermediate container. Conducting some of the replacement air via the bypass channel 17 into the body of material intended for conveying facilitates the displacement of material and prevents blockages occurring.

In FIG. 4 the waste has already been displaced from the situation of FIG. 3 farther in the direction of the material conveying pipe 100. From the bypass channel 17 replacement air is further fed into the body of material to be conveyed. The arrows in the figures describe the flow of air.

The operation of the input points of FIGS. 1-4 is described in more detail below. An input point 1 comprises an enclosure 13, which forms the walls of the input point. An input aperture 2 is formed in the enclosure 13 of the input point, in the figure in the front wall of it. A shut-off means 3 is arranged in connection with the input aperture 2, which shut-off means can be moved between at least two positions, a first position, in which it prevents the feeding in of material to inside the enclosure of the input point via the input aperture 2, and a second position, in which the input aperture 2 is open. In the embodiment of FIGS. 1a, 1b, 1c, 1d the front wall of the input point 1 is formed to be curved. The front wall connects the side walls. The rear wall of the input point connects the side walls from the opposite side with respect to the front wall. The top wall of the input point is formed in the embodiment of the figure to be sloping from the front wall side downwards towards the rear wall. In the embodiment of FIGS. 1-4 there is a fixing point 136 on the bottom part of the input point 1, from which fixing point the input point can be fixed to its mounting surface s. Apertures 14, in the figure (presented in more detail e.g. in FIGS. 6-10) in a grating or grille, are arranged or formed in the enclosure 13 of an input point 1, e.g. for conducting replacement air to inside the enclosure 13 of the input point. Inside an input point is a vertical channel part 10, which can be connected at its bottom part to a material conveying channel 20, such as to an intermediate container or to material conveying piping 100. FIG. 1 presents one embodiment of an input point 1, in which the connection of the input point with a coupling part 15, 151 to the channel 20 is described. Also the grating parts or grille parts that are in connection with the apertures 14, which parts are arranged in the figure in the enclosure 13 of an input point 1, on the side walls and on the rear wall of it, are presented in more detail in FIGS. 6-10.

FIGS. 1-4 present a simplified view of an input point 1 according to one embodiment, sectioned on the vertical plane. The input point is arranged with a fixing part 136 onto its mounting surface s. The feed-in container 10, which in the figure is a vertical channel part, of an input point is connected at its bottom part to a material conveying channel 20 with a coupling part 15. An input point thus has a vertical channel part 10, in the wall of which an aperture 201 is formed at the point of the input aperture 2 of the input point. In the embodiment of the figure, the aperture 201 is of mainly rectangular shape with rounded corners. The aperture 201 of the channel part can be an input aperture 2 at least in an embodiment in which the channel part 10 forms the outer wall, or part thereof, of the input point. Since the wall of the channel section 10 in the embodiment of the figure is ring-like, more particularly a circle, in its cross-sectional shape in the sectioning direction of the plane that is orthogonal to its longitudinal axis, the aperture is therefore in a curved wall type of envelope. Depending on the embodiment, the cross-sectional shape of the channel can be also of some other shape, such as an ellipse, a polygon or some other suitable shape. Formed in the channel part 10 is a second aperture, a pathway 60 for replacement air, i.e. a replacement air valve, for conducting replacement air from the input point via the channel part 100 into the material conveying channel 20 and onwards into a material conveying pipe 100. According to one embodiment replacement air is conducted from the replacement-air aperture 63 (in FIG. 3) of the replacement air pathway 60, when the suction of a partial-vacuum generator, such as fans or a vacuum pump, of the pneumatic material conveying system acts via the material conveying pipe 100 in the input point, in the material conveying channel of it. The channel part 10 is closed at the top part with a wall 112 and is connected at the bottom part to the material conveying channel 20. A first shut-off means 3, and its drive means 4, 5, are arranged in an input point 1, which first shut-off means in a first position (FIG. 2) is adapted to close the connection via the input aperture 2 to inside the input point, into the feed-in container 10' of it, which is in the space bounded by the channel part 10. The first shut-off means 3 has a second position (FIG. 1), in which the shut-off means does not prevent the feeding of material via the input aperture 2 into the feed-in container 10' bounded by the channel space of the channel part. In the embodiment of FIG. 1 the second position of the first feed means is downwards from the first position. In the embodiment of FIG. 1 the first shut-off means 3 in the second position is also arranged to close the replacement-air aperture 63, i.e. the pathway 60 of the replacement air from outside the channel part 10 to inside the channel part 10.

In the embodiment of FIGS. 1-4 a second shut-off means 61 is arranged in the input point, which shut-off means in the first position (FIG. 2) closes the pathway 60 for replacement air to inside the channel part 10 via the access opening for replacement air. The second shut-off means 61 has a second position, in which the second shut-off means does not prevent the passage of replacement air to inside the channel part 10 via the access opening for replacement air. The second position of the second shut-off means 61 is presented in FIG. 1, in which the second position is downwards from the first position. Drive devices 62, 621 are arranged to drive the second shut-off means 61.

The first shut-off means 3 is arranged according to the embodiment of FIGS. 1-4 inside the space bounded by the walls of the channel part 10. The outer wall of the first shut-off means is directed towards the inner wall of the channel part 10. In the figure the first shut-off means is a ring-like shut-off means in its cross-sectional shape. According to one embodiment the first shut-off means is a bushing means. According to one embodiment the shut-off means is a mainly tubular means. A bevel sloping inwards in the radial direction is formed in the top part 301 of the first shut-off means 3. It is adapted to suit the countersurface of the wall 111 of the input point, which in the embodiment of the figure is formed at the same point in the height direction as the top part of the edge of the input aperture 2 or of the aperture 201 of the channel part.

The drive means 4, 5 of the first shut-off means 3 in the embodiment of the figure comprise an actuator, such as a cylinder-piston combination. A piston 501 is arranged in the cylinder space of the cylinder 4, the piston rod 5 of which piston is fixed at its opposite end with respect to the piston 501 to the shut-off means 3 with a coupling arrangement. In the embodiment of the figure a support part 303 is arranged on the bottom part 302 of the shut-off means, which support part extends to outside the wall of the channel part. The support part 303 is arranged on the piston rod 5 with a fixing part 304. In the embodiment of FIGS. 1-4 the inner surface of the channel part 10 can function as the guide surface of the first shut-off means 3. In the embodiment of the figures the support part 303 is arranged on the bottom part 302 of the first shut-off means 3, e.g. on the end surface of the shut-off means. In the embodiment of the figure, the support part 303 comprises a ring-like section, which is arranged on the bottom end surface of the shut-off means, and the actual support part extending outwards in the radial direction from the ring-like section. The support part extends from the aperture formed in the wall of the channel part, in the figure from the replacement-air aperture, to outside the channel section 10. The moving device 4, 5 of the first shut-off means 3 is arranged in the embodiment of the figures in the space between the outer wall of the channel section 10 and the enclosure 13 of the input point. The moving device is supported on the structures of the input point, e.g. on the wall of the channel section 10.

By arranging the first shut-off means 3 to be a ring-like means, such as a bushing means, an advantageous solution is achieved for moving the shut-off means in relation to the forces exerted by the suction and by the transporting air flow that are brought about by a partial-vacuum generator of the material conveying system acting in the channeling of an input point of a pneumatic material conveying system. With the arrangement, relatively small surface areas are in practice achieved in the shut-off means, on which surface areas the resultant of the forces of the pressure difference act (because some of the radial forces acting on the rim of a ring-like bushing means compensate others). In this case it is possible to achieve a solution wherein the input aperture can be formed to be that desired in terms of its surface area and the actuator of the shut-off means can nevertheless be formed to be relatively small, owing to the relatively small forces needed according to the embodiment of the invention to move a bushing-type shut-off means.

The second shut-off means 61 is arranged according to the embodiment of FIGS. 1-4 inside the space bounded by the walls of the channel part 10. The outer wall of the second shut-off means 61 is directed towards the inner wall of the channel part 10. In the figure the second shut-off means is a ring-like shut-off means in its cross-sectional shape. According to one embodiment the second shut-off means is a bushing means. The top part 601 of the second shut-off means 61 is adapted to fit the countersurface of the bottom part 302 of the first shut-off means 3. The top part 601 of the second shut-off means is in the first position arranged in the height direction close to the edge of the top part of the second aperture, i.e. of the replacement-air aperture.

The drive means 62, 620 of the second shut-off means 61 in the embodiment of the figure comprise an actuator, such as a cylinder-piston combination. A piston 622 is arranged in the cylinder space of the cylinder 62, the piston rod 621 of which piston is fixed at its opposite end with respect to the piston 622 to the second shut-off means 61 with a coupling arrangement. In the embodiment of the figure a support part 603 is arranged on the top part 601 of the shut-off means, which support part extends to outside the wall of the channel part. The support part 603 is arranged on the piston rod 621 with a fixing part 604. In the embodiment of FIGS. 2a-2c the inner surface of the channel part 10 can function as the guide surface of the second shut-off means 61. In the embodiment of the figures the support part 603 is arranged on the top part 601 of the second shut-off means 61, e.g. on the end surface of the shut-off means. In the embodiment of the figure the support part 603 comprises a ring-like section, which is arranged on the top end surface of the shut-off means, and the actual support part extending outwards in the radial direction from the ring-like section. The support part 603 extends from the aperture formed in the wall of the channel part, in the figure from the replacement-air aperture 63, to outside the channel section 10. The moving device 62, 621 of the second shut-off means 61 is arranged in the embodiment of the figures in the space between the outer wall of the channel section 10 and the enclosure 13 of the input point. The moving device is supported on the structures of the input point, e.g. on the wall of the channel section 10.

By arranging the second shut-off means 61 to be a ring-like means, such as a bushing means, an advantageous solution is achieved for moving the shut-off means in relation to the forces exerted by the suction and by the transporting air flow that are brought about by a partial-vacuum generator of the material conveying system acting in the channeling of an input point of a pneumatic material conveying system. With the arrangement, relatively small surface areas (e.g. the end surface of a shut-off means) are in practice achieved in the shut-off means, on which surface areas the resultant of the forces of the pressure difference act (because at least some of the radial forces acting on the rim of a ring-like bushing means compensate others). In this case it is possible to achieve a solution wherein the replacement-air aperture can be formed to be that desired in terms of its surface area and the actuator of the shut-off means can nevertheless be formed to be relatively small, owing to the relatively small forces needed according to the embodiment to move a bushing-type shut-off means. According to one embodiment a ring-shaped protrusion, such as an O-ring seal, is arranged on the bottom part 602 of the second shut-off means 61, extending from the side surface of said means, which protrusion has a relatively small surface area on which the force effect resisting the movement direction or movement of the shut-off means is, for its part, exerted.

FIGS. 1-4 are presented in a diagrammatic and simplified manner for the sake of clarity, so that both drive means and their operating states can be presented in the same figure.

FIG. 2 presents a situation in which both shut-off means, the first shut-off means 3 and the second shut-off means 61, are in the first position. In this case both the input aperture 2 and the access opening of the pathway 60 for replacement air are closed. In this case material cannot be fed into the channel part 10 of the input point from the input aperture 2. In this case the replacement air pathway from the replacement-air aperture into the channel space 10' of the channel part 10 is closed. In this operating state the intermediate containers of the other input points of the system, other than that presented in the figure, can be emptied. The material that is in the container space of the intermediate container of the input point of FIG. 2 must remain stationary. By means of the bypass channel 17 it is possible in this case to compensate the effect of a change in volume resulting from the pressure difference of the suction acting from the direction of the material conveying pipe and the atmospheric pressure of the input point and to compensate possible air leaks from outside the input point into the channel space that otherwise try to displace the material in the channel space towards the material conveying pipe 100.

FIG. 3 presents a situation in which the second shut-off means 61 has been displaced inside the channel part 10 with the drive means 62, 621 from the first position (FIG. 2) into the second position (FIG. 3). In this case replacement air is able to flow via the replacement-air aperture of the wall of the channel part 10 into the channel space 10' of the channel part. In FIG. 3 the replacement air flow is described with arrows passing through the replacement air aperture. When replacement air is fed in, the first shut-off means 3 is in the first position closing the input aperture 2. The material w displaces from the intermediate container into the material conveying pipe and at the same time some of the replacement air is conducted via the bypass channel 17 into the body of material to be conveyed.

When it is desired to feed more material into the input point 1, the first shut-off means 3 is displaced into the second position (FIG. 1) with the drive means 4, 5. In this case the first shut-off means 3 displaces away from the point of the input aperture 2 and material can be fed in from the input aperture into the feed-in container of the input point 1, i.e. into the channel space 10' of the channel part 10. In the embodiment of FIG. 1 the first shut-off means 3 has displaced into the second position, in which the bottom part 302 of the first shut-off means 3 is against the top part 601 of the second shut-off means 61 that is in the second position.

In the embodiment of FIGS. 1-4 the inner wall of the shut-off means 3, 61 forms the inside surface of the channel space 10' of the feed-in container, or at least a part of the inside surface. In the embodiment of the figures the first shut-off means 3 is a ring-like shut-off means, e.g. a bushing means. In the embodiment of the figures the second shut-off means 61 is a ring-like shut-off means, e.g. a bushing means. The drive means of a shut-off means 3, 61 can, in terms of their operating principle, be e.g. electrically-operated actuators, hydraulic actuators, pneumatic actuators or some other suitable actuators, depending on the application.

Figure 5:
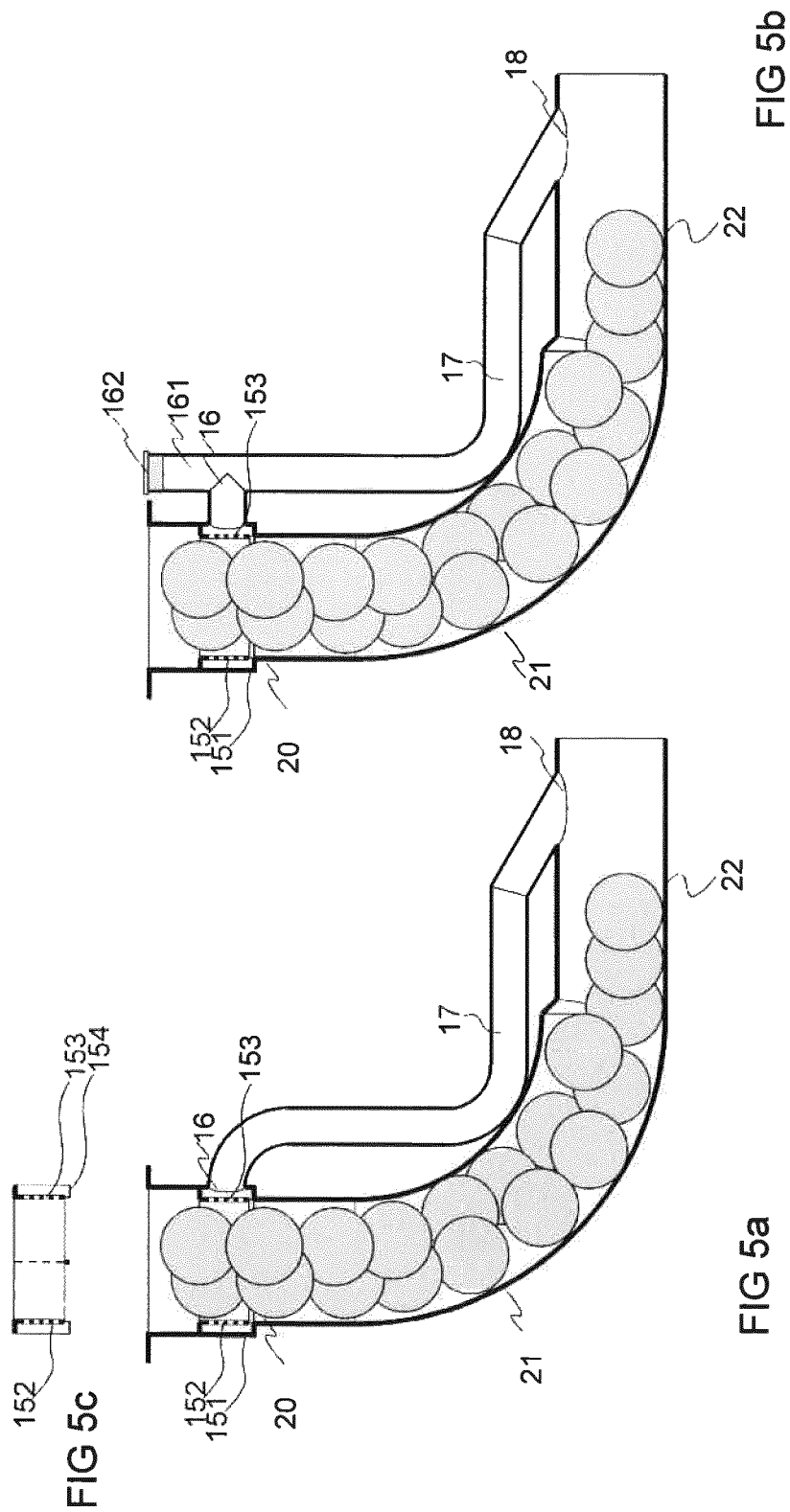
FIG. 5a presents a partially sectioned detail of a device of an embodiment of the invention.
FIG. 5b presents a partially sectioned detail of a device of an embodiment of the invention.
FIG. 5c presents a partially sectioned detail of a device of an embodiment of the invention.

FIGS. 5a, 5b and 5c present details of the combination of a channel part 20, 21, 22 and a bypass channel 17 according to one embodiment. As presented in the embodiment according to the figures, a horizontal channel section 22 is arranged in the intermediate container. In this case material is fed in by gravity into the vertical channel section 20 of the intermediate container, and into the curving channel section 21 following it, and to some extent also into the horizontal channel section 22. The material is conveyed from the intermediate container by arranging a negative pressure effect in the intermediate container from the direction of the material conveying pipe 100 and, correspondingly, replacement air from the direction of the input point 1, in which case the waste material is conveyed in the channel part under the combined effect of these towards the material conveying pipe 100.

The horizontal channel section provides the apparatus according to the invention with the advantage, among others, that the size of the intermediate container can easily be significantly increased compared to an earlier vertical intermediate container.

A section 151 broader than the diameter of the cross-section of the channel part is formed on the end of the channel part 20, on the input point side of it, said section extending a distance from the first end towards the second end. The first end 16 of the bypass channel 17 is connected to the channel part at the point of an aperture formed at the point of the expansion to the wall. The second end 18 of the bypass channel 17 is arranged in the channel part 20 at a distance from the first end, in FIG. 5a close the second end of the channel part, at the point of an aperture formed in the side wall. A wall part 152 provided with apertures 153, the wall part in the figure essentially corresponding to the diameter of the channel part 20, is arranged in the expanded section of the channel part. Support parts 154 (FIG. 5c) are arranged on the wall part 12, externally to it, the support parts together with the collar centering the wall part 152 with respect to the walls of the expanded section 151. In FIG. 5b is an embodiment in which a connection point 161, e.g. for connecting a cleaning means or a suction/blowing means to the bypass channel, is formed in the first end of the bypass channel, in which case an effective arrangement e.g. for cleaning the bypass channel 17, if necessary, is obtained. According to one preferred embodiment the connection point 161 is provided with a plug 162.

FIGS. 6-10 present a feed-in station of a pneumatic pipe transport system for wastes, which station comprises at least two input points 1. There can be the desired number of input points. In the embodiment of FIGS. 6-10 there are e.g. four input points 1. The input points 1 are typically for a number of different categories of material. FIGS. 6-10 thus present four input points 1, which in the embodiment can be intended for each different category of material. Depending on the application site, there can be more or fewer input points in the feed-in station. Also there can be a higher or lower number of material categories intended for feeding into the input points 1 of the feed-in station. The input points 1 intended for different material categories are marked in FIGS. 6-10 with the different reference numbers 101, 102, 103, 104. The material categories can be for example: mixed waste, paper, biowaste and cardboard. Depending on the application site there can also be other material categories, e.g. plastic, glass, metal, et cetera.

FIGS. 6-10 thus present four parallel input points 1, each of which has its own intermediate container section 20 as an extension of the feed-in container 10 in the direction of travel of the material. The intermediate container sections of the different input points are hereinafter marked with the numbers 20(I), 20(II), 20(III) and 20 (IV). The channel sections forming the intermediate containers of the input points are formed into an arrangement in which the intermediate container of one first input point 101 is formed from the channel parts 20(I), 21(I), 22 (I) between the input point 101 and the actual material conveying pipe 100. In the embodiment of the figures the intermediate container 20(I) comprises firstly a vertical channel section 20 (I) connected to the coupling part 15 of the input point and a curving channel section 21(I), that joins the vertical channel section to the horizontal channel section 22(I) of the intermediate container.

In the figure a horizontal channel section 23 is arranged as an extension of the intermediate container section of the fourth input point 104 that is situated farthest from the material conveying pipe 100 in the material conveying direction, most suitably into the horizontal channel section 22(IV), between the input point 1 and the material conveying pipe 100, to which channel section 23 the adjacent input points 101, 102, 103 are connected.

The intermediate container 22(I) of the first input point 101 is connected to the channel section 23 between the fourth intermediate container 20(IV) and the material conveying pipe 100. The intermediate container 20(II) of the second input point 102 is connected to the channel section 23, to the section between the intermediate container 20(I) of the first input point 101 and the intermediate container 20(IV) of the fourth input point 104. The intermediate container 20(III) of the third input point 103 is connected to the channel section 23, to the section between the intermediate container 20(II) of the second input point 102 and the intermediate container 20(IV) of the fourth input point 104. According to the figures the input points 101, 102, 103, 104 are therefore arranged in medium connection with the material conveying pipe 100, but also with each other. Owing to this, so that the intermediate container of one input point can be emptied of material w at the same time as an intermediate container of the other input points is not intended to be emptied, a bypass channel 17 is arranged in connection with the intermediate container 20(I), 20(II), 20(III), 20(IV) of each input point 101, 102, 103, 104. With the bypass channel 17 it is possible to compensate the effect of a change in volume resulting from a pressure difference of the intermediate container of an input point that is intended not to be emptied, i.e. the so-called piston effect of the material, and the effect of possible leakage air when suction acts from the direction of the material conveying pipe 100, so that the undesired displacement of material into the material conveying pipe 100 from the intermediate container of the input point in question that is intended not to be emptied is prevented. This is described above, inter alia, in connection with FIG. 2.

Correspondingly, in the part of the intermediate container of an input point intended to be emptied, the bypass channel 17 can be used for conducting some of the replacement air from the second end 18 of the bypass channel into the body of material that is in the material conveying channel and is intended for conveying. This is described earlier, inter alia, in connection with FIGS. 3 and 4.

Figure 9:
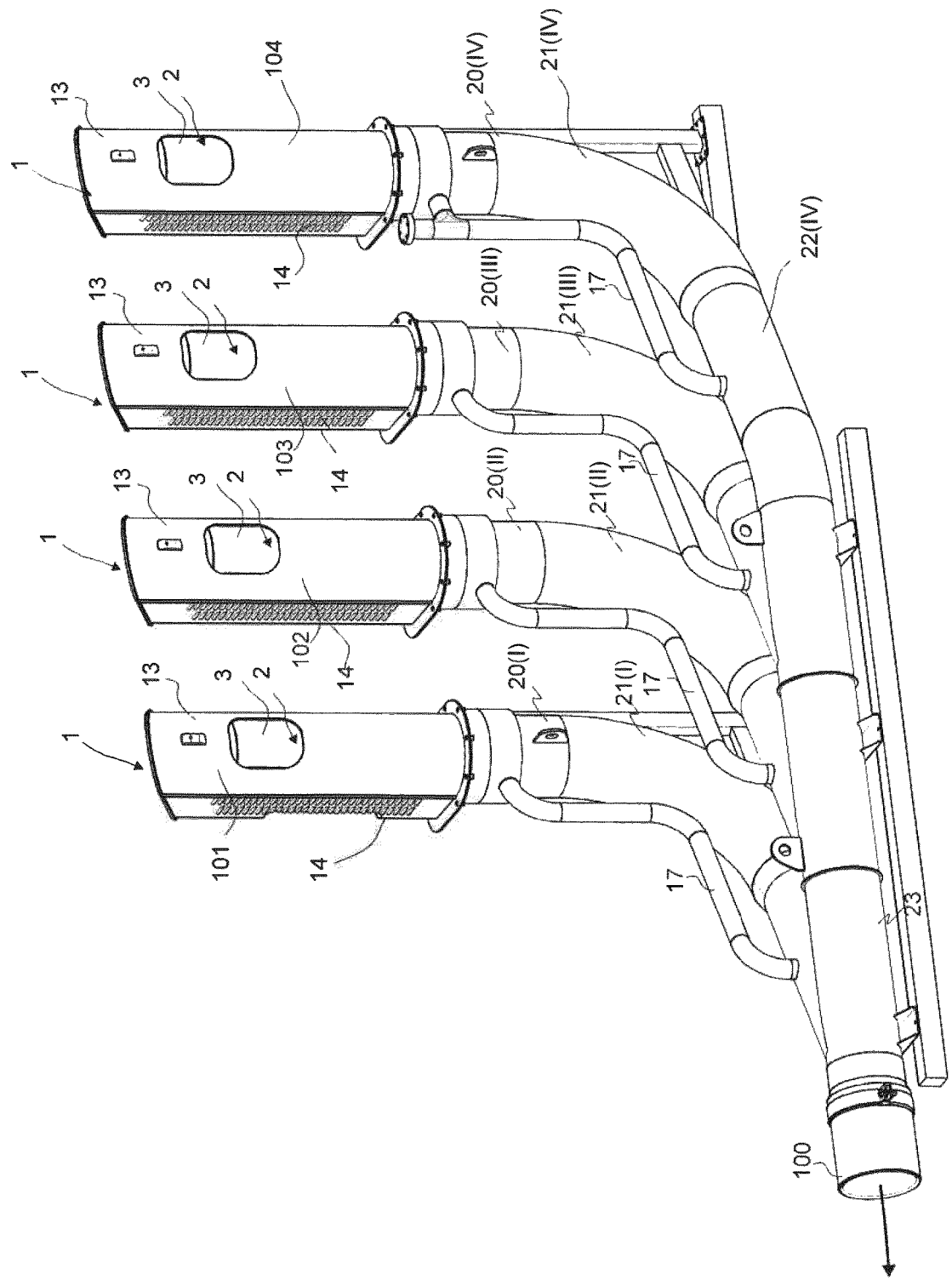
FIG. 9 presents an apparatus of the invention from a first direction, with the envelope of one input point partially sectioned.
Figure 10:
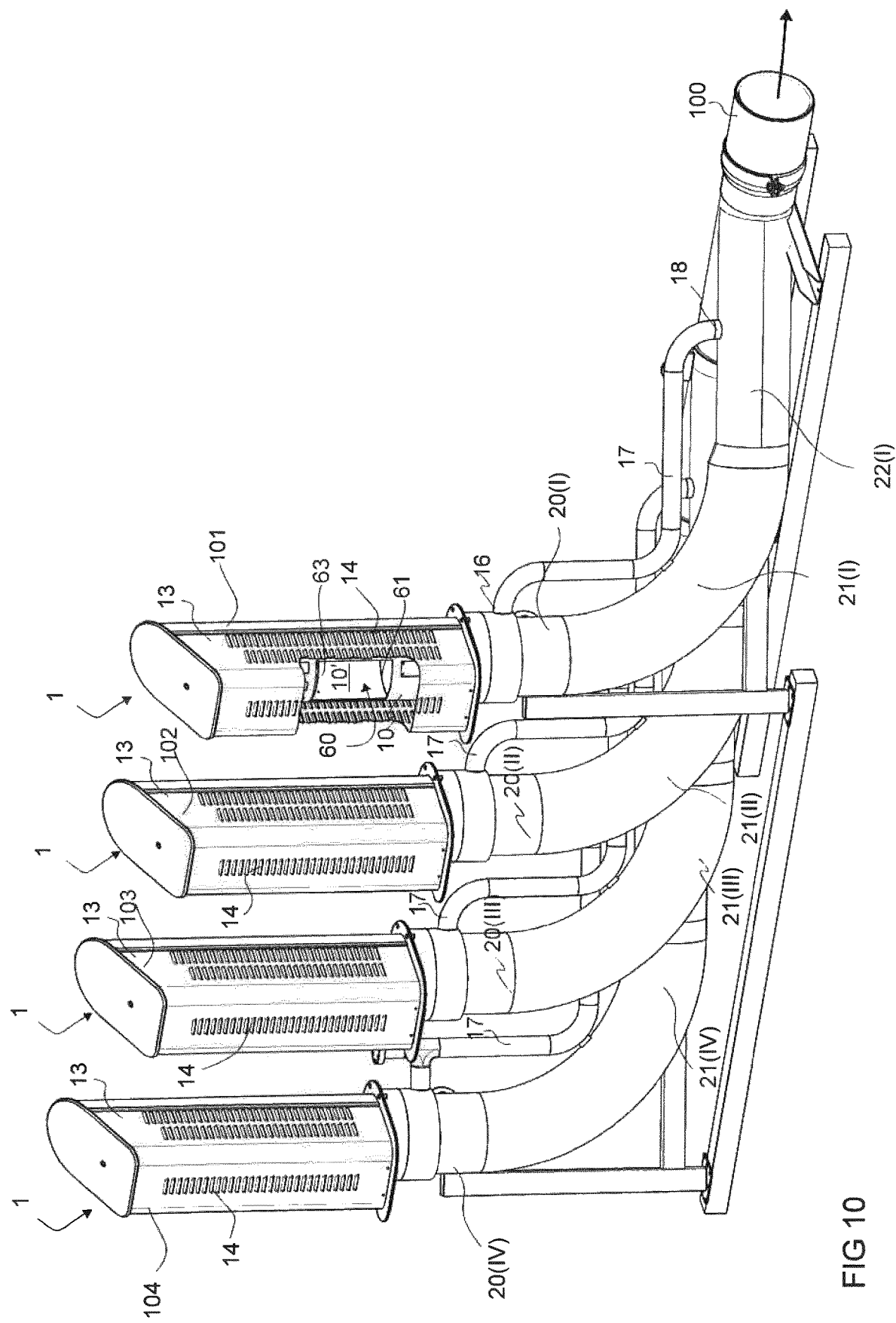
FIG. 10 presents an apparatus of the invention from a second direction, with the envelope of one input point partially sectioned.

FIGS. 9 and 10 present the partially sectioned enclosure 13 one input point 101. The grating or grille 14 of the enclosure 13 and the replacement air pathway 60 via the replacement-air aperture 63 formed in the channel 10 can, on the other hand, be seen from FIG. 10. For the sake of clarity, FIG. 10 has been simplified in respect of the sectioned first input point 101 by omitting the drive means of the shut-off means 61.

When sufficient material has been fed in, or it is otherwise desired to perform emptying of the intermediate containers of the input points of the feed-in station into the material conveying pipe, e.g. the emptying sequence hereinafter can be followed. The input aperture of the input point is closed with the first shut-off means and the pathway 60 for replacement air is closed with the second shut-off means.

The suction side of the partial-vacuum source is connected to act, e.g. via the separating means, in the material conveying pipe 100, which is in connection with the intermediate containers of the input points 101, 102, 103, 104. The replacement air valve 60 of the first input point 101 is opened, in which case the material starts to displace from the effect of suction and a replacement air flow towards the material conveying pipe 100. Replacement air is also brought from the second end of the bypass channel 17 of the first input point 101 into the channel 22(I) of the intermediate container. The effects of leakage air of the other input points 102, 103, 104 are compensated, with the bypass channels 17 of each input point 102, 103, 104, in which case the undesired displacement of material w in their intermediate containers (20(II), 20(III), 20(IV) . . . 22(II), 22(III), 22(IV) into the material conveying pipe 100 together with the material w of the intermediate container 20(I), 21(I), 22(I) of the first input point 101 is avoided.

When the intermediate container 20(I), 21(I), 22(I) of the first input point 101 to be emptied has been emptied of material w into the material conveying pipe 100, the replacement air valve 60 of the input point 102 to be emptied secondly is opened, the replacement air valve of the first input point 101 is closed, in which case the material that has collected in the intermediate container 20(II), 21(II), 22(II) of the second input point 102 starts to displace into the material conveying pipe. Replacement air is also conducted from the second end 18 of the bypass channel 17 of the second input point 102 into the medium channel 22(II). The effects of leakage air of the other input points 101, 103, 104 are compensated, with the bypass channels 17 of each input point 101, 103, 104, in which case the undesired displacement of material in their intermediate containers into the material conveying pipe together with the material of the intermediate container of the second input point 102 is avoided.

The process is continued correspondingly until all the desired input points 101, 102, 103, 104 and the intermediate containers 20(I), 20(II), 20(III), 20(IV) . . . 22(I), 22(II), 22(III), 22(IV) of them have been emptied. The replacement air pathway 60 of the input point intended to be emptied last is closed.

When the desired input points have been emptied, the suction of the partial-vacuum generator intended for displacement can be switched off and the infeeding of material w into the input points 101, 102, 103, 104 can be continued from their input apertures 2 by opening the shut-off means 3. This process is continued until it is again desired to start emptying the intermediate container of one or more input points.

When the emptying sequence has been completed, there can be a return to the situation of FIG. 1 and again the intermediate containers of the input points 101, 102, 103, 104 can start to be filled. Other emptying sequences can also be used, in which case e.g. the intermediate containers of input points that fill up faster are emptied more frequently than the others.

The apparatus thus comprises means for conducting replacement air into the channel section of an intermediate container. An input aperture 2 is formed in the enclosure 13 of an input point 1, which enclosure forms the outer walls of the input point, for feeding material into the feed-in container of the input point, as well as apertures 14 (FIG. 9) for conducting replacement air to inside the enclosure. The replacement air passes to inside the enclosure 13 through the grating-type apertures 14 and onwards via the replacement air valve 60 into the container 10. FIG. 9 presents the apertures 14 formed in the enclosure 13 of an input point for conducting replacement air to inside the enclosure 13. Most of the replacement air is conducted via the feed-in container 10 into the channel space of the intermediate container 20, 21, 22 and onwards into the material conveying pipe 100, when the suction of a partial-vacuum generator of the pneumatic conveying system for wastes is able to act from the material conveying pipe 100 into the feed-in container. According to an embodiment of the invention a bypass channel 17 is arranged, which according to one embodiment is arranged from an input point 1, from the channel space 10' of the feed-in container 10 of it, or from the channel space of the intermediate container 20 that is an extension of it, into the channel section 22 of the intermediate container.

The apparatus typically comprises at least two input points 1, a channel section 20, 21, 22 functioning as an intermediate container, into which waste material is arranged to be conveyed from an input point 1, and also means for conveying the waste material from an input point into the intermediate container. From the channel section functioning as an intermediate container the waste material is conveyed onwards in the material conveying piping 100 of the pneumatic conveying system for waste material. In the material conveying piping 100 the waste material displaces together with the transporting air into a reception point, such as a waste station, of the system, in which separating device the waste material being transported is separated from the transporting air and conveyed for further processing or into a shipping container. The operation of a pneumatic wastes conveying system is not described in more detail here. Various examples of pneumatic wastes transporting systems are presented generally, e.g. in publications WO 2009/080880, WO 2009/080881, WO 2009/080882, WO 2009/080883, WO 2009/080884, WO 2009/080885, WO 2009/080886, WO 2009/080887, WO 2009/080888, and WO/2011/110740.

The invention thus relates to a method for compensating a change in volume caused by a pressure difference of the intermediate container of an input point of a pneumatic pipe collection system for material and/or for preventing undesired material displacement from the intermediate container. In the method a bypass channel 17 is arranged in the channel section 20, 21, 22 formed by the intermediate container of an input point for compensating a change in volume resulting from the pressure difference of the pressures of different magnitudes possibly acting on different sides of the material w and/or for preventing undesired material displacement from the channel section 20, 21, 22 into the material conveying pipe 100.

According to one embodiment in the method at least possible leakage air flowing from an input point 1 is arranged to mainly travel in the bypass channel 17.

According to one embodiment the bypass channel 17 is arranged to bypass at least most of the accumulation of material w fed into the intermediate container.

According to one embodiment the first end 16 of the bypass channel 17 is arranged in the channel section 20, 21, 22, in the starting section of it, and the second end 18 of the bypass channel is arranged in the channel section 20, 21, 22, in the ending section of it, in which case most of the material w possibly in the intermediate container formed by the channel section is in the channel section 20, 21, 22 in the space between the starting section and the ending section.

According to one embodiment in the method waste material or recyclable material is fed into a feed-in container 10 from the input aperture 2 of at least two input points 1 of a pneumatic pipe transport system for material and onwards into the channel section 20, 21, 22 that is between the feed-in container and the material conveying pipe 100, which channel section functions as an intermediate container, from where the material w is conveyed into the material conveying pipe 100, from the combined effect of the suction brought about by a partial-vacuum generator of the pneumatic pipe collection system for material acting from the direction of the material conveying pipe 100 and the replacement air acting from the direction of an input point that is subject to the effect of the surrounding air pressure, by opening a pathway for replacement air, and onwards along with the transporting air via the material conveying pipe 100 to the delivery end of the pneumatic material conveying system, where the material is separated from the transporting air. According to one embodiment in the method suction is connected via the material conveying pipe 100 to act in the channel section 20, 21, 22 of an input point, said channel section functioning as an intermediate container, and the input aperture 2 of the input point and a possible pathway 60 for replacement air into the channel section 20, 21, 22 from the direction of the input point is kept essentially closed, the infed material w is kept in the intermediate container of the channel section 20, 21, 22, and a bypass channel 17 is arranged in the channel section 20, 21, 22 of the input point for compensating a change in volume resulting from the pressure difference of the pressures of different magnitudes possibly acting on different sides of the material w and/or for preventing undesired material displacement from the channel section 20, 21, 22 into the material conveying pipe 100.

According to one embodiment the intermediate container of at least one other input point 1 is emptied at the same time by allowing the passage of replacement air from the direction of the input point into the intermediate container and by maintaining suction from the direction of the material conveying pipe.

According to one embodiment when emptying the intermediate container of the channel section 20, 21, 22 of an input point, some of the replacement air is conducted to travel in the bypass channel 17.

According to one embodiment in the material conveying phase the entry of replacement air is allowed, e.g. the replacement air valve 60, for a certain time.

According to one embodiment at least when it is not desired to displace the material, possible leakage air of an input point is conducted into a bypass channel 17, the flow aperture of which is smaller than the flow cross-sectional area of the channel part 20, 21, 22 from which the suction of the partial-vacuum generator of the pneumatic material conveying system acts.

According to one embodiment there are a number of input points 1, 101, 102, 103, 104, in which case in the first phase material w is fed from a first and/or at least from one other input point into the channel section 20(I), 21(I), 22(I) . . . 20(IV), 21(IV), 22(IV) of each input point, which channel section is an intermediate container of material, mainly by means of gravity, in the second phase the material is conveyed from one of the input points from the channel section 20(I), 21(I), 22(I) . . . 20(IV), 21(IV), 22(IV) by the combined effect of suction and replacement air into the conveying piping 100, and onwards towards the material delivery end of the pneumatic material conveying system, and the pathway 60 for replacement air of the other input points is kept closed and the change in volume brought about by the pressure difference in their channel parts 20(I), 21(I), 22(I) . . . 20(IV), 21(IV), 22(IV) and/or the effect of leakage air is compensated by means of the bypass channel 17 of each input point.

The invention also relates to an apparatus for compensating a change in volume caused by a pressure difference of the intermediate container of the material channel 20, 21, 22 of an input point 1 of a pneumatic pipe collection system for material and/or for preventing undesired material displacement from the intermediate container. The apparatus comprises a bypass channel 17 in the channel section 20, 21, 22 formed by the intermediate container of an input point for compensating a change in volume resulting from the pressure difference of the pressures of different magnitudes possibly acting on different sides of the material w and/or for preventing undesired material displacement from the channel section 20, 21, 22 into the material conveying pipe 100, which bypass channel forms a pathway for a gaseous medium at least partly past the material space of the intermediate container.

According to one embodiment the bypass channel 17 is also adapted to be a pathway for any leakage air that is possibly flowing from an input point. According to one embodiment the first end 16 of the bypass channel 17 is arranged in the channel section 20, 21, 22, in the starting section of it, and the second end 18 of the bypass channel is arranged in the channel section 20, 21, 22, in the ending section of it, in which case most of the material space formed in the intermediate container by the channel section can be fitted in the channel section 20, 21, 22 in the space between the starting section and the ending section.

According to one embodiment the bypass channel 17 is also adapted to be a pathway for some of the replacement air when emptying an intermediate container.

According to one embodiment the apparatus is fitted into the channel section of at least one input point 1 of a pneumatic pipe transport system for wastes, which pneumatic pipe transport system comprises at least one input point 1 having an input aperture 2 into the feed-in container 10 and onwards into the channel section 20, 21, 22 arranged between the feed-in container and the material conveying pipe 100, which channel section is adapted to function as an intermediate container, from where the material is adapted to be conveyed via a material conveying pipe 100 to the delivery end of the pneumatic wastes conveying system, where the material is separated from the transporting air, which apparatus can be connected to the conveying pipe 100, into which the suction side of a partial-vacuum generator can be connected to act, in which case the material is adapted to be displaced by the combined effect of the suction brought about by the partial-vacuum generator and the replacement air acting from the other side of the material, i.e. from the input point side.

According to one embodiment there are a number of input points 1, 101, 102, 103, 104, in which case in the first phase material w is adapted to be fed from a first and/or at least from one other input point into the channel section 20(I), 21(I), 22(I) . . . 20(IV), 21(IV), 22(IV) of each input point, which channel section is an intermediate container of material, mainly by means of gravity, in the second phase the material is adapted to be conveyed from one of the input points from the channel section 20(I), 21(I), 22(I) . . . 20(IV), 21(IV), 22(IV) by the combined effect of suction and replacement air into the conveying piping 100, and onwards towards the material delivery end of the pneumatic material conveying system, and the pathway 60 for replacement air of the other input points is adapted to be kept closed and the change in volume brought about by the pressure difference in their channel parts 20(I), 21(I), 22(I) . . . 20(IV), 21(IV), 22(IV) and/or the effect of leakage air is adapted to be compensated by means of the bypass channel 17 of each input point.

According to one embodiment the apparatus comprises replacement air means for conducting replacement air in a regulated manner into the channel section 20, 21, 22 between an input point and the material w, which means are adapted to open and close a pathway for replacement air.

According to one embodiment the apparatus comprises a channel section 20, 21, 22 arranged between an input point 1 and the material conveying pipe 100, which channel section comprises a channel section deviating from the vertical direction, such as a mainly horizontal channel section, which is adapted to function as an intermediate container.

According to one embodiment the flow aperture of the bypass channel 17 is smaller than the flow cross-sectional area of the channel part 20, 21, 22 from which the suction of the partial-vacuum generator of the pneumatic material conveying system acts.

According to one embodiment the cross-sectional area of the bypass channel 17 is preferably approx.10-25% of the cross-sectional area of the pipe of the material conveying pipe.

The object of the invention is also a wastes conveying system, which comprises an apparatus according to any of the aforementioned characteristic features.

Typically the material is waste material, such as waste material arranged in bags. An input point and an intermediate container can be adapted to be a part of a pneumatic waste conveying system or it can be a separate part, in which waste material is conducted into a waste room, waste container or corresponding.

It is obvious to the person skilled in the art that the invention is not limited to the embodiments presented above, but that it can be varied within the scope of the claims presented below. The characteristic features possibly presented in the description in conjunction with other characteristic features can also, if necessary, be used separately to each other.

The invention claimed is:

1. A method for compensating a change in volume caused by a pressure difference of an intermediate container of an input point of a pneumatic pipe collection system for material or for preventing undesired material displacement from the intermediate container, comprising the following steps:

arranging a bypass channel at least for:

compensating a change in volume resulting from the pressure difference of pressures of different magnitudes possibly acting on different sides of the material in a channel section functioning as the intermediate container of the input point, or for;

preventing undesired material displacement from the channel section into a material conveying pipe, when a suction side of a partial-vacuum generator is connected to act in the channel section from a direction of the material conveying pipe of the pneumatic pipe collection system;

wherein at least when there is no intention to empty the intermediate container of the input point, possible leakage air of the input point is conducted into the bypass channel, a flow aperture of which is smaller than a flow cross-sectional area of a channel part from which the suction of the partial-vacuum generator of the pneumatic material conveying system acts.

2. The method according to claim 1, wherein in the method possible leakage air from the input point is arranged to mainly flow in the bypass channel.

3. The method according to claim 1, wherein the bypass channel is arranged to bypass most of the accumulation of material fed into the intermediate container.

4. The method according to claim 1, wherein a first end of the bypass channel is arranged in a starting section of the channel section, and a second end of the bypass channel is arranged in an ending section of the channel section, in which case most of the material fed into the intermediate container formed by the channel section is accumulated in the space between the starting section and the ending section of the channel section.

5. The method according to claim 1, in which method waste material or recyclable material is fed from the input point of the pneumatic pipe collection system for material into a feed-in container and onwards into the channel section that is between the feed-in container and the material conveying pipe, which channel section functions as the intermediate container, from where the material is conveyed into the material conveying pipe, by the combined effect of the suction brought about by the partial-vacuum generator of the pneumatic pipe collection system for material acting from the direction of the material conveying pipe and the replacement air acting from the direction of the input point that is subject to the effect of the surrounding air pressure, by opening a pathway for replacement air, and onwards along with the transporting air via the material conveying pipe to the delivery end of the pneumatic material conveying system, where the material is separated from the transporting air, wherein when the method suction is connected via the material conveying pipe to act in the channel section of the input point, said channel section functioning as an intermediate container, and the input point and a possible pathway for replacement air into the channel section from the direction of the input point is kept essentially closed, the infed material is kept in the intermediate container of the channel section, and the bypass channel is arranged at least one: for compensating a change in volume resulting from the pressure difference of the pressures of different magnitudes possibly acting on different sides of the material in the channel section of the input point or for preventing undesired material displacement from the channel section into the material conveying pipe.

6. The method according to claim 5, wherein the intermediate container of at least one other input point is emptied at the same time by allowing the passage of replacement air from the direction of the input point into the intermediate container and by maintaining suction from the direction of the material conveying pipe.

7. The method according to claim 1, wherein when an emptying of the intermediate container of the channel section of the input point occurs, some of the replacement air is conducted to travel in the bypass channel.

8. The method according to claim 1, wherein when emptying the intermediate container of the channel section and conveying material, the entry of replacement air towards the material conveying pipe is allowed, by opening a replacement air valve of the input point, for a certain time.

9. The method according to claim 1, wherein said input point includes a plurality of input points, in which case in the first phase material is fed at least from a first input point into the channel section of a corresponding input point, which channel section is an intermediate container of material, mainly by means of gravity, in the second phase the material is conveyed from at least the first input point to the channel section by the combined effect of suction and replacement air into the material conveying piping and onwards towards the material delivery end of the pneumatic material conveying system and the pathway for replacement air of the other input points is kept closed and the change in volume brought about by the pressure difference in their channel parts or the effect of leakage air is compensated by means of the bypass channel of each input point.

10. An apparatus for compensating a change in volume caused by a pressure difference of an intermediate container of a material channel section of at least one input point of a pneumatic pipe collection system for material or for preventing undesired material displacement from the intermediate container, wherein the apparatus comprises:
a bypass channel configured for at least one of:
compensating a change in volume resulting from the pressure difference of pressures of different magnitudes possibly acting on different sides of the material in the material channel section functioning as the intermediate container of the input point, or
preventing undesired material displacement from the material channel section into a material conveying pipe, which bypass channel forms a pathway for a gaseous medium at least partly past a material space of the intermediate container,
at least when a suction side of a partial-vacuum source generator is connected to act in the channel section from a direction of the material conveying pipe of the pneumatic pipe conveying system,
wherein a flow aperture of the bypass channel is smaller than a flow cross-sectional area of the channel section from which the suction of the partial-vacuum generator of the pneumatic material conveying system acts.

11. The apparatus according to claim 10, wherein the bypass channel is also adapted to be a pathway for any leakage air that is possibly flowing from the input point.

12. The apparatus according to claim 10, wherein a first end of the bypass channel is arranged in the starting section of the channel section, and a second end of the bypass channel is arranged in the ending section of the channel section, in which case most of the material space formed in the intermediate container by the channel section is fitted into the space in the channel section between the starting section and the ending section.

13. The apparatus according to claim 10, wherein the bypass channel is also adapted to be a pathway for some of the replacement air when emptying an intermediate container.

14. The apparatus according to claim 10, wherein the apparatus is mounted into the channel section of the at least one input point of a pneumatic pipe collection system for wastes, which pneumatic pipe collection system comprises the at least one input point having an input aperture into a feed-in container and onwards into the channel section arranged between the feed-in container and the material conveying pipe, which channel section is adapted to function as an intermediate container, from where the material is adapted to be conveyed via the material conveying pipe to the delivery end of the pneumatic wastes conveying system, where the material is separated from the transporting air into which the suction side of a partial-vacuum generator that is connected to act, in which case the material is adapted to be displaced by the combined effect of the suction brought about by the partial-vacuum generator and the replacement air acting from the input point side.

15. The apparatus according to claim 10, wherein there the at least one input point includes a plurality of input points, in which case in the first phase material is adapted to be fed from the at least one other input point into the channel section of each input point, which channel section is the intermediate container of material, mainly by means of gravity, in the second phase the material is adapted to be conveyed from one of the input points from the channel section from the combined effect of suction and replacement air into the conveying piping and onwards towards the material delivery end of the pneumatic material conveying system and the pathway for replacement air of the other input points is adapted to be kept closed and at least one of the change in volume brought about by the pressure difference in their channel parts or the effect of leakage air is adapted to be compensated by means of the bypass channel of each input point.

16. The apparatus according to claim 10, wherein the apparatus comprises a movable bushing for conducting replacement air in a regulated manner into the channel section between the input point and the material, the movable bushing being adapted to open and close a pathway for replacement air.

17. The apparatus according to claim 10, wherein the apparatus comprises a channel section arranged between the input point and the material conveying pipe, which channel section comprises a channel section deviating from the vertical direction, which is adapted to function as the intermediate container.

18. The apparatus according to claim 10, wherein the cross-sectional area of the bypass channel is approx. 10-25% of the cross-sectional area of the material conveying pipe.

19. A wastes conveying system, which comprises the apparatus according to claim 10.

* * * * *